US010960788B2

(12) United States Patent
Andres et al.

(10) Patent No.: US 10,960,788 B2
(45) Date of Patent: Mar. 30, 2021

(54) ADJUSTING DEVICE FOR A SEAT ELEMENT OF A VEHICLE SEAT

(71) Applicant: Brose Fahrzeugteile GmbH & Co. Kommanditgesellschaf Coburg, Coburg (DE)

(72) Inventors: Christian Andres, Wiesenthal (DE); Sebastian Eichhorn, Oberweissbach/OT Lichtenhain (DE); Florian Schmieder, Coburg (DE); Christian Mergl, Zeil/Main (DE); Hans-Joerg Birkefeld, Coburg (DE)

(73) Assignee: BROSE FAHRZEUGTEILE GMBH & CO. KOMMANDITGESELLSCHAFT, COBURG, Coburg (DE)

( * ) Notice: Subject to any disclaimer, the term of this patent is extended or adjusted under 35 U.S.C. 154(b) by 221 days.

(21) Appl. No.: 16/097,816

(22) PCT Filed: Apr. 27, 2017

(86) PCT No.: PCT/EP2017/060009
§ 371 (c)(1),
(2) Date: Jan. 17, 2019

(87) PCT Pub. No.: WO2017/191025
PCT Pub. Date: Nov. 9, 2017

(65) Prior Publication Data
US 2019/0143848 A1    May 16, 2019

(30) Foreign Application Priority Data
May 3, 2016    (DE) .................. 10 2016 207 620

(51) Int. Cl.
*B60N 2/08* (2006.01)
*B60N 2/68* (2006.01)
*B60N 2/12* (2006.01)
*B60N 2/02* (2006.01)
*B60N 2/28* (2006.01)
*B60N 2/90* (2018.01)
*B60N 2/885* (2018.01)

(52) U.S. Cl.
CPC ............ *B60N 2/0837* (2013.01); *B60N 2/02* (2013.01); *B60N 2/12* (2013.01); *B60N 2/2872* (2013.01);
(Continued)

(58) Field of Classification Search
CPC ...... B60N 2/0837; B60N 2/02; B60N 2/2872; B60N 2/99; B60N 2/885; B60N 2/12; B60N 2/682
See application file for complete search history.

(56) References Cited

U.S. PATENT DOCUMENTS 6,068,336 A    5/2000    Schonauer
2009/0026821 A1    1/2009    Macht et al.
(Continued)

FOREIGN PATENT DOCUMENTS

DE    2541559 A1    3/1977
DE    9014111 U1    1/1991
(Continued)

Primary Examiner — D Glenn Dayoan
Assistant Examiner — Melissa Ann Bonifazi
(74) Attorney, Agent, or Firm — Lewis Roca Rothgerber Christie LLP

(57) ABSTRACT

It is provided an adjusting device for a seat element of a vehicle seat, the strength structure of said seat element being connected to a guide device which substantially oriented in a first spatial direction and on which a support and a slide are arranged in a longitudinally adjustable manner relative to each other by means of a first drive device. A support lever which changes the contour of the seat element and which is hinged to the support and a toggle lever which is hinged to the slide and to the support lever via a connection joint are pivotable about axes which are oriented in a second spatial direction running perpendicularly to the first spatial direction and pivot on a plane defined by the first spatial direction and a third spatial direction running perpendicularly to the
(Continued)

first and second spatial direction when the first drive device is actuated.

14 Claims, 14 Drawing Sheets

(52) U.S. Cl.
CPC ............ *B60N 2/682* (2013.01); *B60N 2/885* (2018.02); *B60N 2/99* (2018.02)

(56) References Cited

U.S. PATENT DOCUMENTS

| | | |
|---|---|---|
| 2011/0266849 A1 | 11/2011 | Schwarze |
| 2015/0165935 A1* | 6/2015 | Sachs ................. B60N 2/22 297/342 |
| 2016/0052436 A1 | 2/2016 | Kim et al. |

FOREIGN PATENT DOCUMENTS

| | | |
|---|---|---|
| DE | 19737271 C1 | 5/1999 |
| DE | 19750116 A1 | 5/1999 |
| DE | 202004013668 U1 | 2/2006 |
| DE | 202005006988 U1 | 9/2006 |
| DE | 102007003642 A1 | 7/2008 |
| DE | 102007041995 A1 | 3/2009 |
| DE | 102008047243 A1 | 3/2010 |
| DE | 202009000559 U1 | 7/2010 |
| DE | 102010061788 A1 | 5/2012 |
| DE | 102010053190 A1 | 6/2012 |
| DE | 102014201049 A1 | 7/2014 |
| DE | 102014208188 A1 | 11/2015 |
| FR | 2730460 A1 | 8/1996 |

* cited by examiner

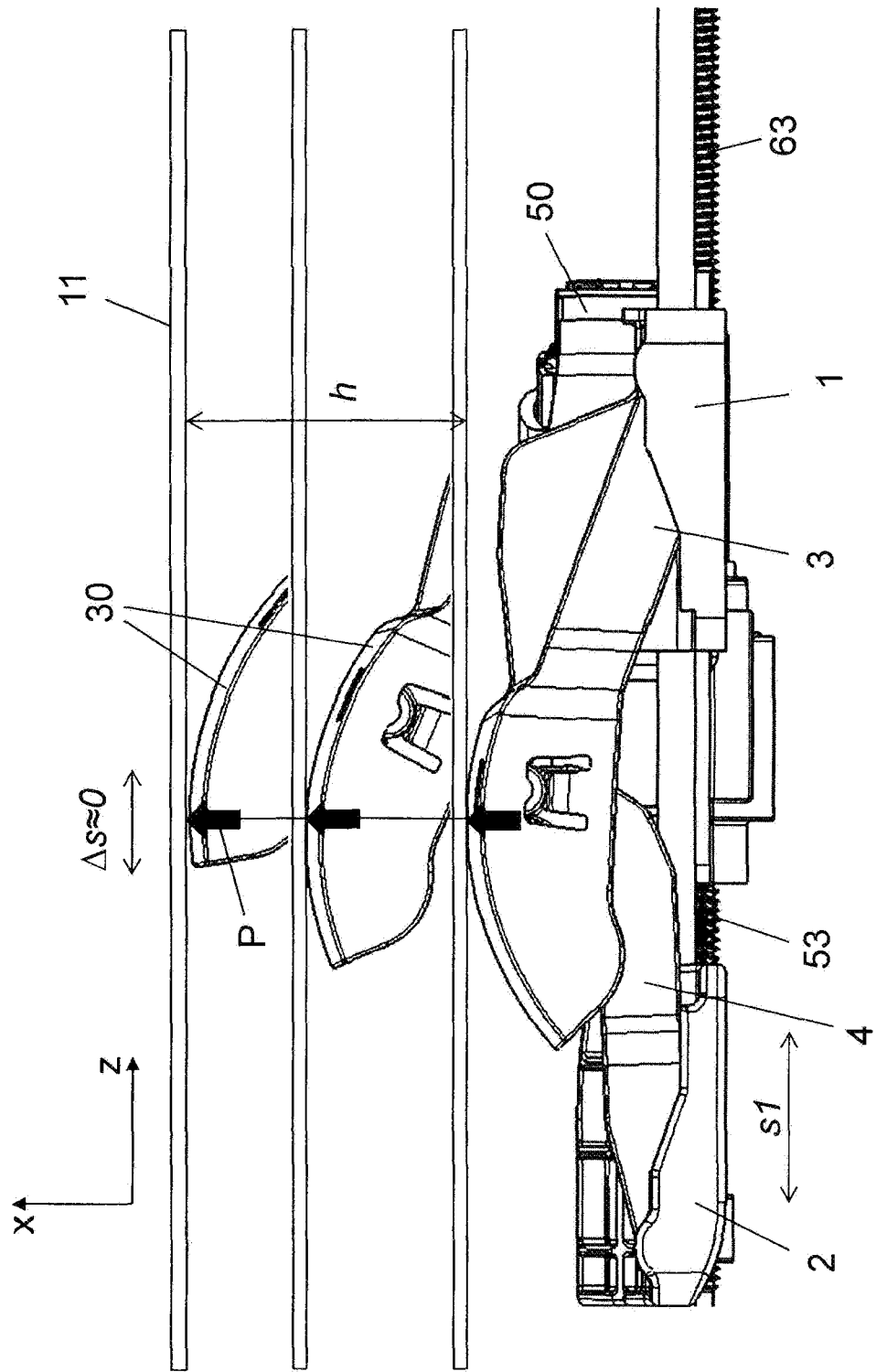

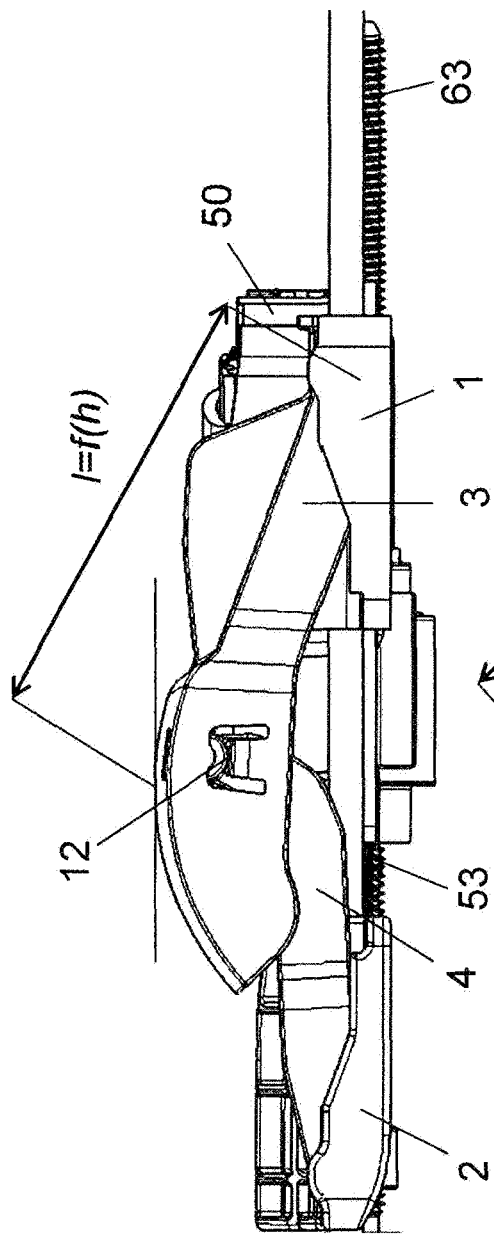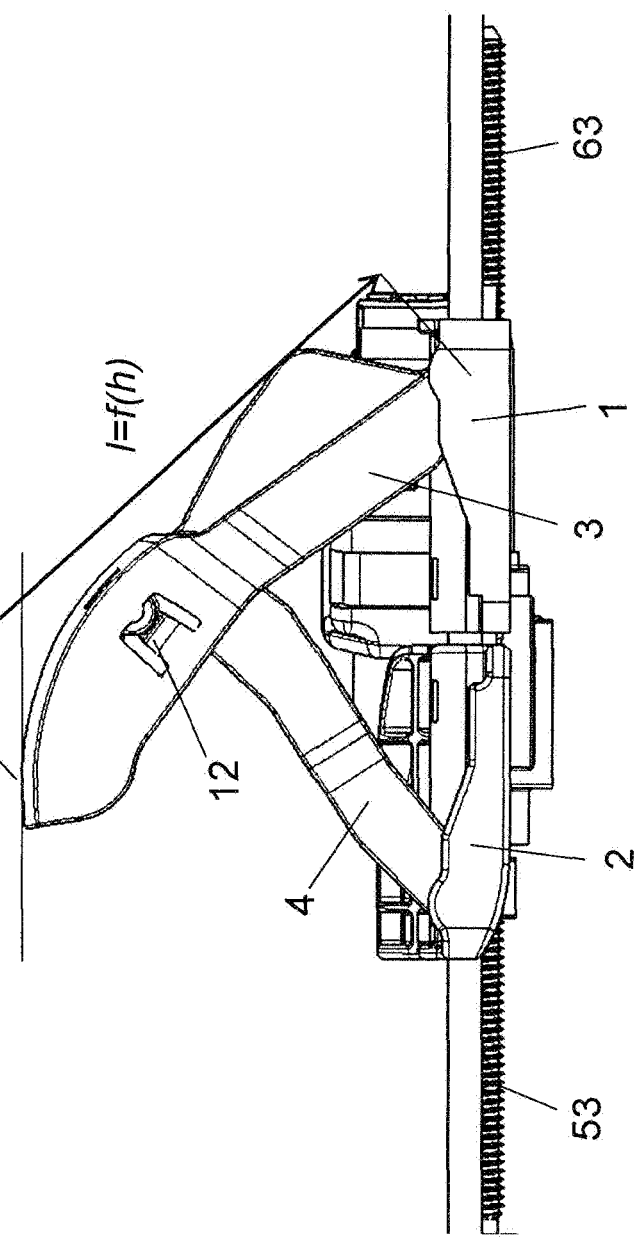

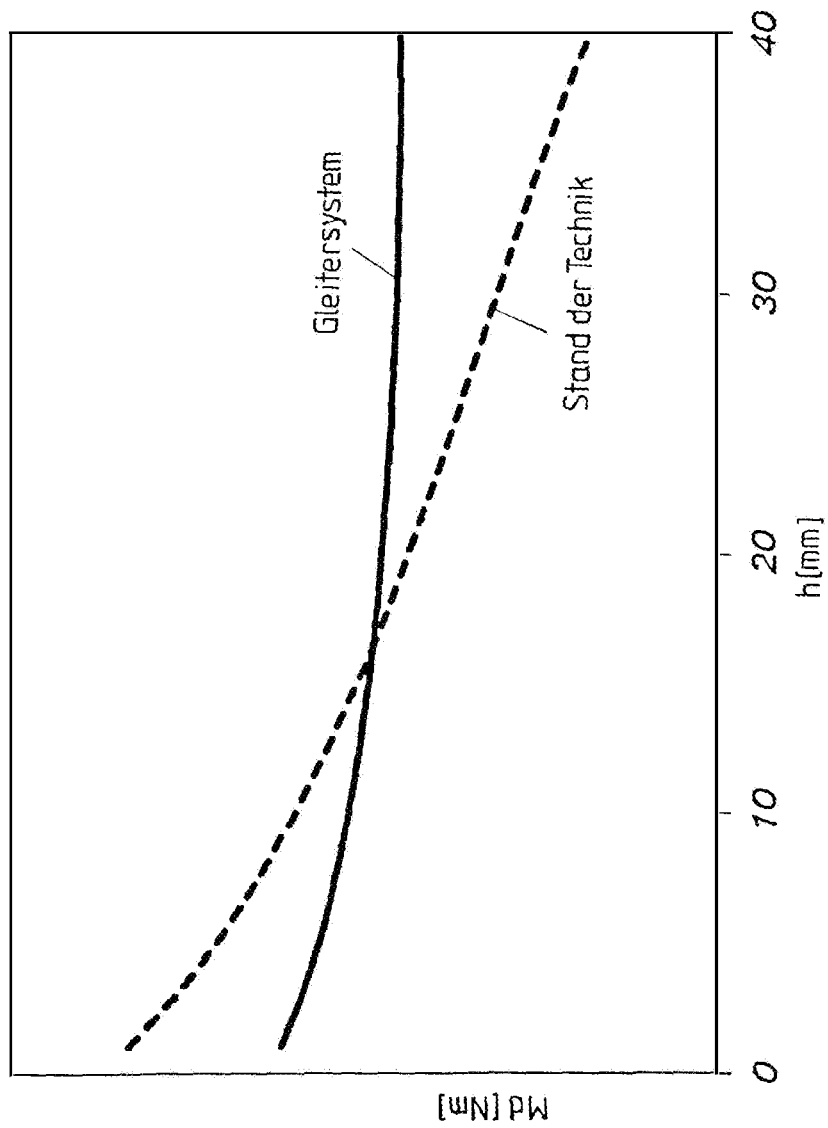

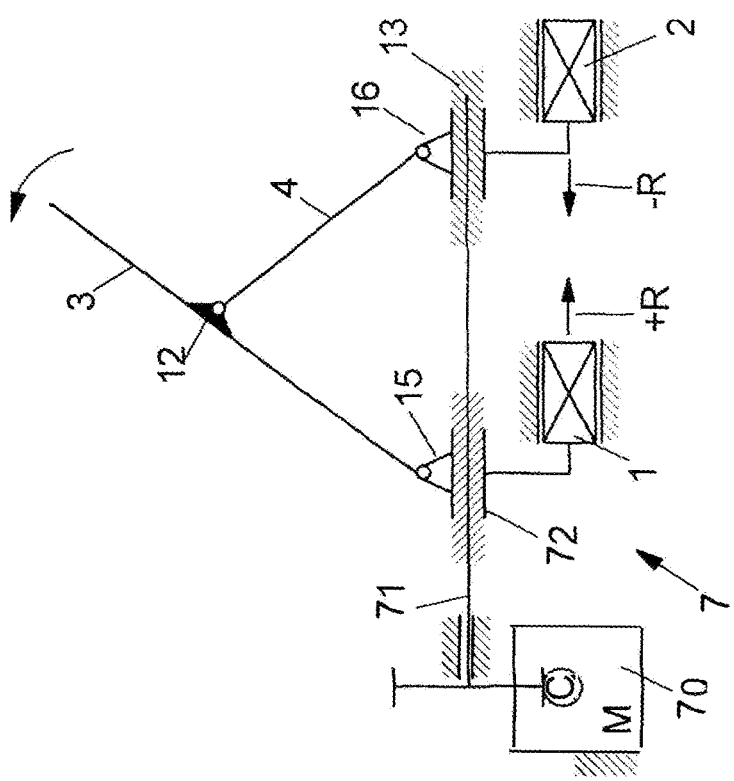
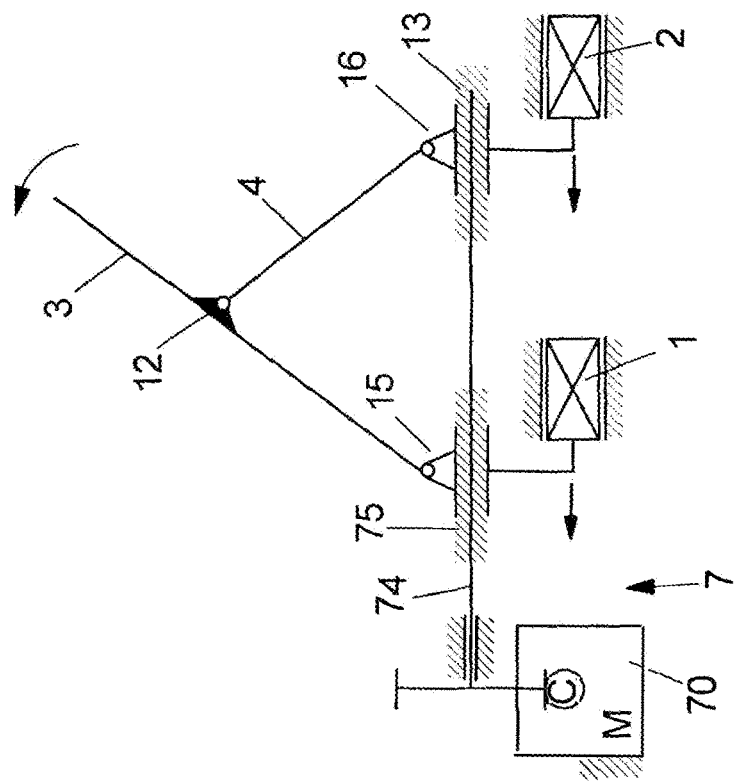

ADJUSTING DEVICE FOR A SEAT ELEMENT OF A VEHICLE SEAT

CROSS-REFERENCE TO A RELATED APPLICATION

This application is a National Phase Patent Application of International Patent Application Number PCT/EP2017/060009, filed on Apr. 27, 2017, which claims priority of German Patent Application Number 10 2016 207 620.5, filed on May 3, 2016.

BACKGROUND

The invention relates to an adjusting device for a seat element of a vehicle seat.

The subject of the invention serves to alter in a variable manner the shape of a support region or a lateral face of the seat lower part, the backrest or headrest of a motor vehicle seat, in particular for adjusting the curvature and/or width of lateral support regions or lateral faces of a seat lower part or a backrest, the support region of an upper backrest part of a divided backrest in the shoulder and head region of a vehicle occupant, a headrest, a lumbar support in the lumbar vertebrae region of a vehicle occupant or a leg support of a seat lower part. In this case, the adjusting device is of modular construction and thus may be used for different adjusting functions and sizes and designs of seat elements.

A seat width adjuster for a motor vehicle seat is disclosed in DE 197 37 271 C1 with lateral support wings which are pivotably articulated on the seat part and/or on the backrest in opposing directions and which are pivotable by means of rotatable curved surfaces of toggle levers bearing against the support wings. The toggle levers in turn are pivotable by means of pull cords moved by an adjusting drive.

A seat width adjuster is disclosed in DE 90 14 111 U1, in which exclusively the geometry of a lateral face is pneumatically adjusted by means of an inflatable spring bellows. As a result of a drop in the internal pressure of the inflatable spring bellows, however, the geometry which was set at one point is lost over time.

It is disclosed in DE 20 2005 006 980 U1 to influence the shape of the lateral face of a vehicle seat by altering the deflection of a spring element which acts on an articulated side wing. To this end, a free end of the spring element is displaceable by means of an adjusting element.

It is disclosed in DE 197 50 116 C2 for influencing the shape of a lateral face of a vehicle seat to provide a U-shaped member which is pivotable counter to spring force. The deflection of the U-shaped member is carried out by means of a tensioning bar which acts on the U-shaped member and which has to be actuated by a tensioning cord. The U-shaped members are configured from spring steel and are twistable at the fastening points thereof.

A lumbar support is disclosed in US 2016/0052436 A1 which contains a fixed wire which is integrated into the strength structure of the backrest of a vehicle seat and which is connected to a support for adjusting a comfort mat. A spindle aligned in the transverse direction of the vehicle and driven by a drive motor is arranged on the support, the thread of said spindle meshing with the opposing threads of two spindle nuts which in each case are arranged at one end of a left-hand and right-hand adjusting arm, the other ends thereof being connected to the comfort mat. A right-hand and left-hand connecting arm is articulated, on the one hand, to the support and, on the other hand, to a central portion of the left-hand and right-hand connecting arm, so that when actuating the drive motor the spindle is rotated in one or other rotational direction and the spindle nuts which are arranged on the spindle with an opposing thread move the adjusting arms toward or away from the connecting arms, so that said connecting arms are moved in an arcuate manner about the articulation thereof on the support and the adjusting arms are lifted and/or lowered relative to the support.

In order to prevent that the contact points of the adjusting arms with the comfort mat do not migrate inwardly and/or outwardly when the adjusting arms are lifted and lowered, which in the case of a lumbar support leads to the pressure points on the back of a vehicle occupant changing in an undesired manner, the length of the connecting arms has to be approximately the same size as the length of the adjusting arms between the articulation of the connecting arms on the adjusting arms and the connection of the adjusting arms to the comfort mat. This design, however, has the drawback of an unfavorable transmission ratio of the adjusting device so that in the case of predetermined loads on the output of the adjusting device, high loads are present on the drive which requires a corresponding dimensioning of the components of the adjusting device. Since when actuating the drive motor for lifting and lowering the adjusting arms a "gearing-up" is implemented, for the use of conventional low-power motors as drive motors, the connection of upstream gear stages is required which implement a "gearing-down" of the rotational speed of the drive motors, resulting in a reduced efficiency of the overall system and accordingly requiring the use of a higher motor power class.

In the known adjusting devices, the transmission ratio from the drive unit to the load on the output side is not able to be adapted to the load path on the output side due to the type of construction, so that with a manual drive different adjusting forces have to be applied depending on the adjustment path and with a motorized drive the load applied to the motor alters and thus the rotational speed of the motor over the adjustment path, which leads to an irregular and disruptive acoustic with unpleasant motor noise.

Moreover, in addition to an adjustment of the contact points with the body of a passenger in the desired adjusting direction, the known adjusting kinematics also lead to an undesired displacement of the contact points which deviates from the desired adjusting direction.

Due to their limited possibilities for adjustment, the known adjusting devices do not permit an optimal adaptation of the seat elements to the individual body shape of a passenger and require at least in some cases in the initial or resting state a considerable space requirement in the adjusting direction, so that the required adjustment paths may be implemented with sufficient adjusting force.

On the one hand, in order to make the adjusting movement and thus the reaction of the adjusting device perceptible when adjusting a seat element from a lowered position, but on the other hand to permit a fine adjustment in the lifted state of the seat element, when actuating the adjusting device in the lowered position of the seat element with a short adjustment path of the adjusting device, a clearly perceptible deflection of the seat element is designed to take place whilst in the lifted state of the seat element a fine adjustment is permitted by large adjustment paths of the adjusting device resulting in only a small degree of lift.

SUMMARY

It is an object of the present invention to provide an adjusting device of the type mentioned in the introduction, which ensures a substantially constant torque requirement and/or a substantially constant rotational speed of the adjusting drive over the adjustment path (lift) and an adjusting speed at the output which reduces over the adjustment path for fine adjustment, for optimal adaptation of the adjustable seat element to the body of a passenger, which requires in the lowered state a minimal constructional space in the adjusting direction, which permits the integration of further adjusting drives in the same direction as the lifting adjustment and a simple, preferably modular, construction for universal applicability and which is of simple construction, ensures safe operation and is able to be produced cost-effectively.

This object is achieved by providing an adjusting device with features as described herein.

The solution according to the invention provides an adjusting device which is of simple construction, ensuring safe operation, and which is able to be produced cost-effectively, for adjusting the position and geometry of seat elements of a motor vehicle seat, in particular for adjusting the curvature and/or width of lateral faces of a seat lower part or a backrest, an upper backrest part of a divided backrest, a lumbar support of a backrest or a leg support of a seat lower part. The adjusting device according to the invention permits a large degree of lift from a small constructional space and implements a transformation from the input movement to the output movement adapted to the load case, so that smaller drive motors may be used, since the required step-down in the upstream gear stages may be reduced, resulting in advantages in efficiency in the entire adjusting system.

Moreover, the adjusting device permits a modular construction for universal applicability, so that even other seating elements of a motor vehicle may be adjusted and as a result a further reduction in the production costs is possible by the use of the same components.

By the alteration of the adjusting speed of the portion of the support lever connected to the seat element, depending on its position relative to a lowered initial position, a variable transformation of the adjusting speed according to the adjustment path and/or lift of the support lever is possible, so that in a lowered position of the support lever a high adjusting speed is achieved, which leads to a perceptible adjustment from the lowered position and, in particular, with an adjustment of the lateral faces facilitates boarding and disembarking by rapid lowering, whilst with continued rising of the support lever the adjusting speed reduces for fine adjustment of the curvature, but the adjusting force increases for compensating, for the increasing cushion tension and the counter-force effected by the passenger, the adjusting force, in particular in the retracted and/or adjusted position relative to the adjusting devices known from the prior art, is increased so that with motorized adjustability of the adjusting device, motors which are small and thus space-saving, low powered and cost-effective may be used which ensure an acceptable adjustment acoustic without unpleasant adjusting noise and as a result of the kinematics of the adjusting device, a large adjustment path achieved from a small constructional space when the support lever is retracted, in which the constructional space is many times larger when the support lever is extended than when the support lever is retracted, wherein relative to the adjusting devices known from the prior art at the same time a transmission from the input movement to the output movement which is adapted to the respective load case is implemented, which also permits the use of small motors since the required step-down in the upstream gear stages may be reduced, which as a whole leads to increased efficiency the entire system relative to the adjusting devices known from the prior art.

The kinematics of the adjusting device according to the invention for a seat element, such as for example a lumbar support, a lateral face adjuster for a seat lower part or a backrest, a headrest adjuster, a backrest or seat surface massage unit, a seat inclination adjuster and seat height adjuster, a footrest or the like transforms a linear movement on the drive side, for example in the +/−Z-direction of a motor vehicle coordinate system, into a curved or circular path, for example about a fixed pivot point in a direction offset by an angle $\alpha$ to the drive direction, for example in the +/−X-direction of the motor vehicle coordinate system. By the lever lengths and/or angles of the support lever and toggle lever to one another, which alter when introducing the linear movement over the lift, a transmission ratio is achieved which alters over the lift, whereby a rapid adjustment is achieved at the start of the movement in the lower region of the lift in the X-direction and a large force is achieved in the upper lift region combined with a slower adjusting speed for the fine adjustment. As a result, amongst other things, the use of small, low-powered but space-saving and cost-effective electric motors is possible with an acceptable adjustment acoustic without unpleasant motor noise.

The support lever which is pivotably mounted on the support and the toggle lever which is pivotably arranged on a slide, which is adjustable in a linear manner relative to the support, for lifting or lowering the portion of the support lever connected to the seat element or the movement thereof on a circular or curved path, ensures in addition to an almost constant force and speed characteristic curve an individual kinematic path in which the support lever is optionally moved in the direction of a passenger on a curved or circular path or, when the adjustment is activated in one spatial direction, the contact point of the support lever remains constant on the adjusting surface of the seat element in the other spatial directions, so that for example in the case of a lumbar support adjustment in the +/−X-direction of the motor vehicle coordinate system, the contact point does not migrate in an undesirable manner in the Y-direction and Z-direction.

For producing the linear movement for driving the slide either a drive unit which due to its design provides a linear movement is used, or in the case of an electromotive drive device the rotational movement of a motor or in the case of a manual drive device the rotation of a lever or a rotary knob about a rotational axis is transformed via one or more gear stages, optionally with a step-up gearing or step-down gearing, into a linear movement.

Preferably, the first drive device comprises a spindle which meshes with a spindle nut connected to the slide.

The circular motion path predetermined by a fixed pivot point of the seat element may be converted into almost any curved path. For example, a lower portion of the seat element may be moved in one direction and the upper portion may be moved in the opposing direction, whereby for example in the case of an adjustment to the lateral face improved lateral support is achieved by optimal bearing against the body of a passenger.

In this case, it may alternatively be provided that the support and the slide comprise a spindle nut which mesh with the same spindle and are adjustable in opposing directions or in the same direction with a different adjusting speed, so that in addition to the linear displacement of the articulation of the toggle lever, the pivot point of the support lever is displaced during the drive movement.

Alternatively or additionally, the spindle may have different thread pitches, the one thread pitch thereof meshing with a spindle nut connected to the support and the other thread pitch thereof meshing with a spindle nut connected to the slide.

For adjusting the seat element in a further spatial direction, for example for height adjustment of a lumbar support or lateral or parallel adjustment of the lateral faces, the support may be connected to a second drive device which is arranged on a guide device and adjusted relative to the strength structure of the vehicle seat.

In a preferred embodiment, the contact region of the support lever bearing against an adjustment surface of the adjustable seat element has a curved contact surface so that a uniform contact point is ensured.

In this variant, the support and the slide are arranged in a longitudinally adjustable manner on a guide device which is connected to the strength structure of the vehicle seat and which is oriented in a first spatial direction and the support is connected to a second drive device for linear adjustment of the support in the first spatial direction and the slide is connected to a first drive device for linear adjustment of the slide in the first spatial direction, whilst the support comprises two support levers which are arranged adjacent to one another in a second spatial direction perpendicular to the first spatial direction and which are connected in an articulated manner to two toggle levers arranged adjacent to one another on the slide, such that when actuating the first drive device the support levers and toggle levers which are connected together in an articulated manner are pivotable in the third spatial direction perpendicular to the first and second spatial direction.

According to the invention, the kinematics of this variant of the adjusting device are determined by a support and a slide which are movable relative to one another on separate guide devices, on guide devices integrated in the support, or directly on guide devices integrated in the structure of the vehicle seat, wherein the support is either installed in a fixed manner or may be moved by a second drive device in a second spatial direction.

If the support is movable in a further spatial direction, it may be displaceably mounted either on one more separate guide(s) or on one or more guide devices integrated in the seat structure.

If the support is installed in a fixed manner, it may be attached either directly via connecting elements integrated in the seat structure, integrated in the seat structure or even mounted on guide devices, wherein in this case a movement of the support is prevented by the fixing of the support.

In an embodiment which is suitable, in particular, for a lumbar support, the guide devices are configured as two-limbed U-shaped wire members, at least the slide being arranged so as to be adjustable in a linear manner on the limbs thereof.

A preferred connection of the support levers with the support and the toggle levers with the slide is implemented via rotary joints which in their shape are adapted to the shape of the support levers and the toggle levers, such that the support levers and toggle levers in an assembled position are able to be connected together without the use of force and in an operating range are positively connected to the support and/or slide such that the support levers and toggle levers are pivotable only within the operating range.

This embodiment of the pivotable attachment of the support levers and toggle levers to the support and the slide permits an assembly without the use of force and in the assembled state a positive connection which is able to absorb large forces, so that when not used correctly, unclipping and transversely introduced forces are prevented.

To this end, the rotary joints consist of a cylinder portion-shaped pivot pin connected to the support or slide, whilst the support levers and toggle levers have fork-shaped joint portions.

In a second variant of the adjusting device according to the invention, which is suitable, in particular, for an adjustment of the lateral faces, the support is connected to the strength structure of the vehicle seat and contains a guide device, a slide which is driven by a drive device and configured as a sliding element being adjustable in a linear manner thereon and being connected in an articulated manner to the toggle lever which is mounted on the support lever which is articulated on the support.

In this variant, as a result of a linear adjustment of the slide, the toggle lever connected in an articulated manner to the slide is raised or lowered and thus triggers a rotary movement of the support lever articulated on the support so that the seat element bearing against the support lever is also raised or lowered. As a result, for example, the angle between a lateral face and a seat or backrest surface may be altered for individual adjustment of the seat width and/or backrest width of a vehicle seat, and thus the lateral support of a passenger may be optimized. Additionally, by lowering the lateral face into a retracted position in which the lateral face is aligned with the seat surface or backrest surface, the boarding of the passenger into a vehicle or the disembarking of the passenger from the vehicle may be facilitated since the increase in the vehicle seat to be overcome in the lateral direction is minimized.

In a preferred embodiment, in this second variant of the adjusting device according to the invention the support lever is configured as a U-shaped side flap, the limbs thereof being connected in an articulated manner to two toggle levers driven together by a drive device and the crosspiece thereof connected to the ends of the limbs being configured as a support surface.

BRIEF DESCRIPTION OF THE DRAWINGS

The idea underlying the invention and variants of the invention which may be derived therefrom are to described in more detail with reference to the exemplary embodiments shown in the drawings.

FIG. 6 shows a schematic perspective side view of the adjusting device for explaining an unaltered contact point with the body of a passenger in the desired adjusting direction.

FIGS. 7, 8 show schematic perspective side views for explaining the kinematics of the adjusting device, with the lever lengths of the support levers altering over the lift and/or the adjusting height.

FIG. 9 shows a graph for comparing the torque requirement of the drive motor over the adjustment path and/or lift in a known adjusting device and in an adjusting device according to the invention.

FIG. 18 shows a schematic view of the linear adjustment of the articulations of a support lever and toggle lever connected to a spindle drive in opposing directions.

FIG. 19 shows a schematic view of the linear adjustment of the articulations of a support lever and toggle lever connected to a spindle drive in the same direction with variable adjusting speed.

DETAILED DESCRIPTION

Figure 1:
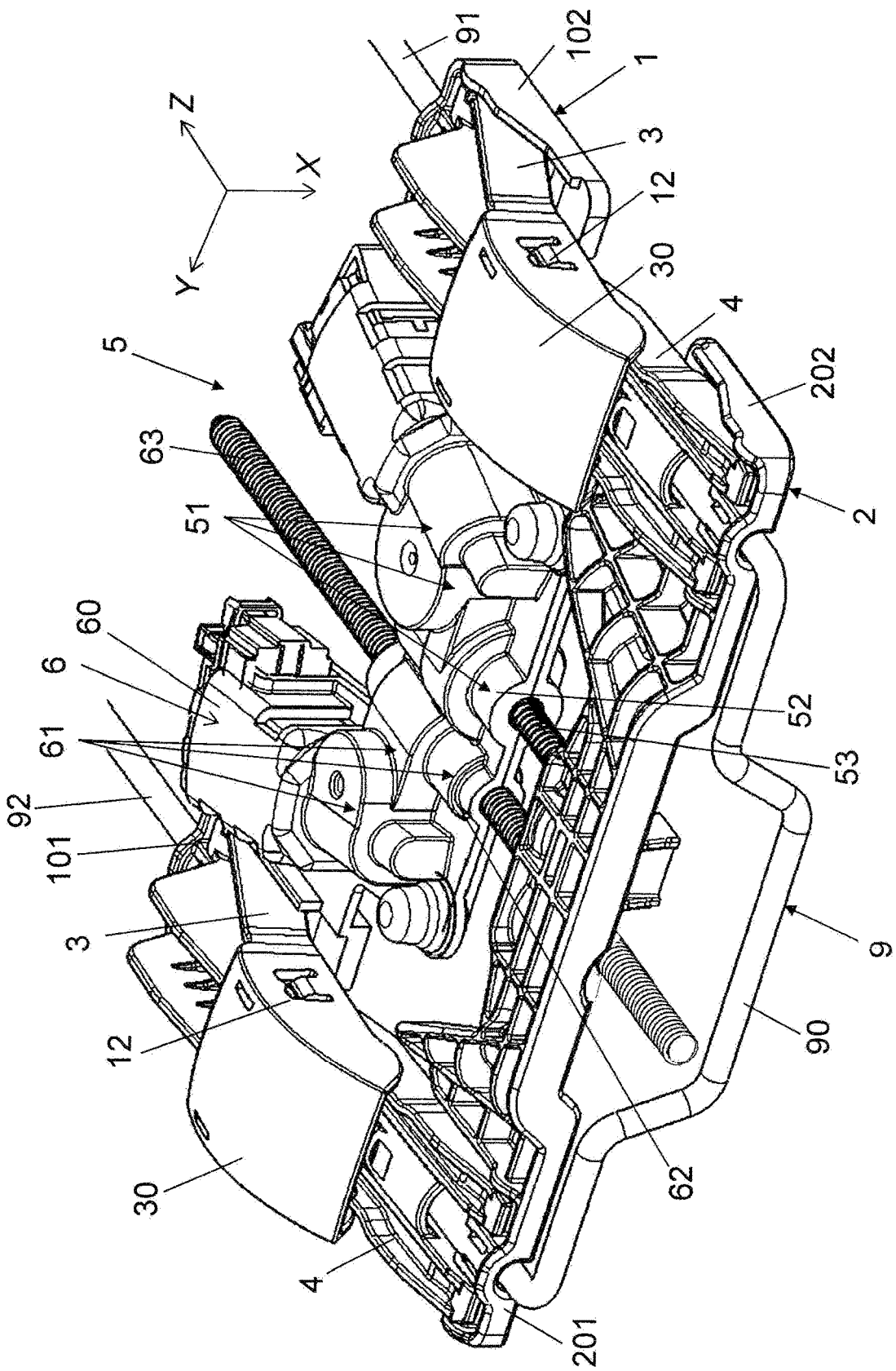
FIG. 1 shows a schematic perspective view of an adjusting device for a lumbar support in the backrest of a vehicle seat with the lumbar support lowered and/or not curved or only minimally curved.

In the perspective views and explanatory sketches, the same parts or parts corresponding to one another of the adjusting device according to the invention are provided in each case with the same reference numerals.

Figure 2:
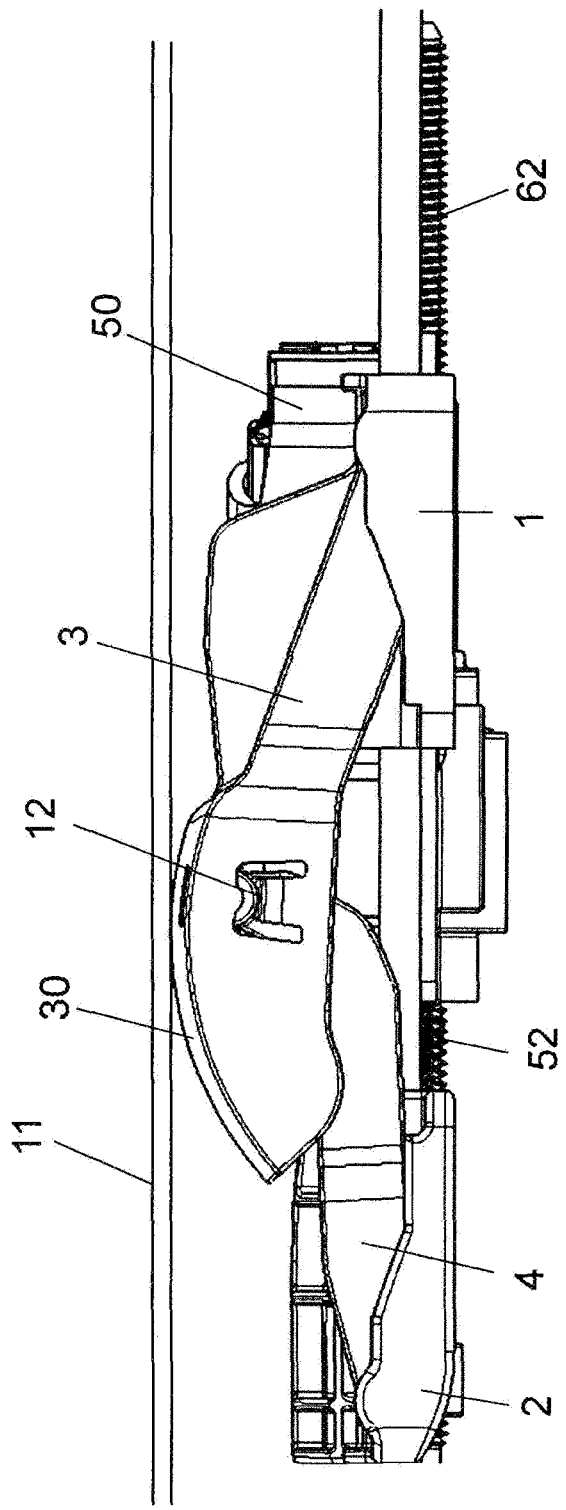
FIG. 2 shows a perspective side view of the adjusting device according to FIG. 1 with the lumbar support lowered.
Figure 3:
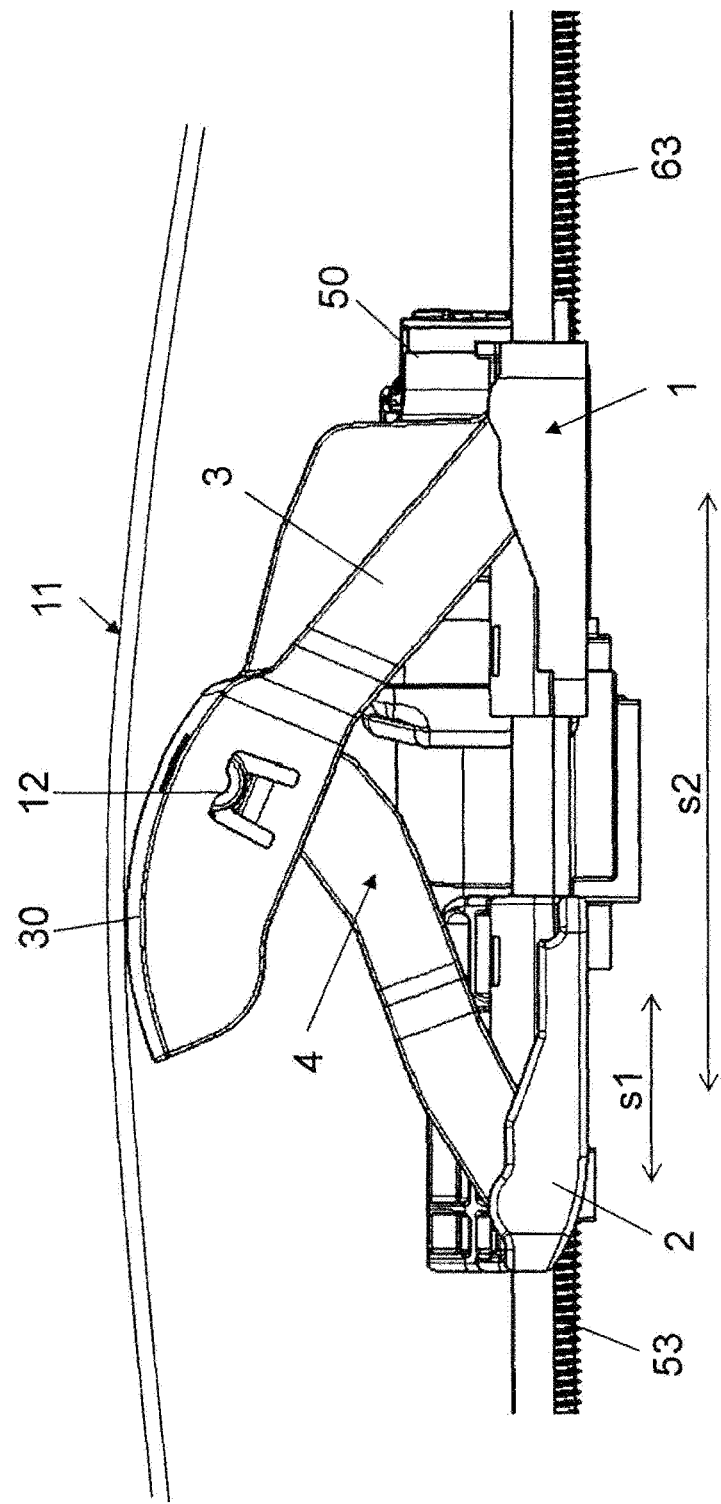
FIG. 3 shows a perspective side view of the adjusting device with the lumbar support raised and/or curved.
Figure 4:
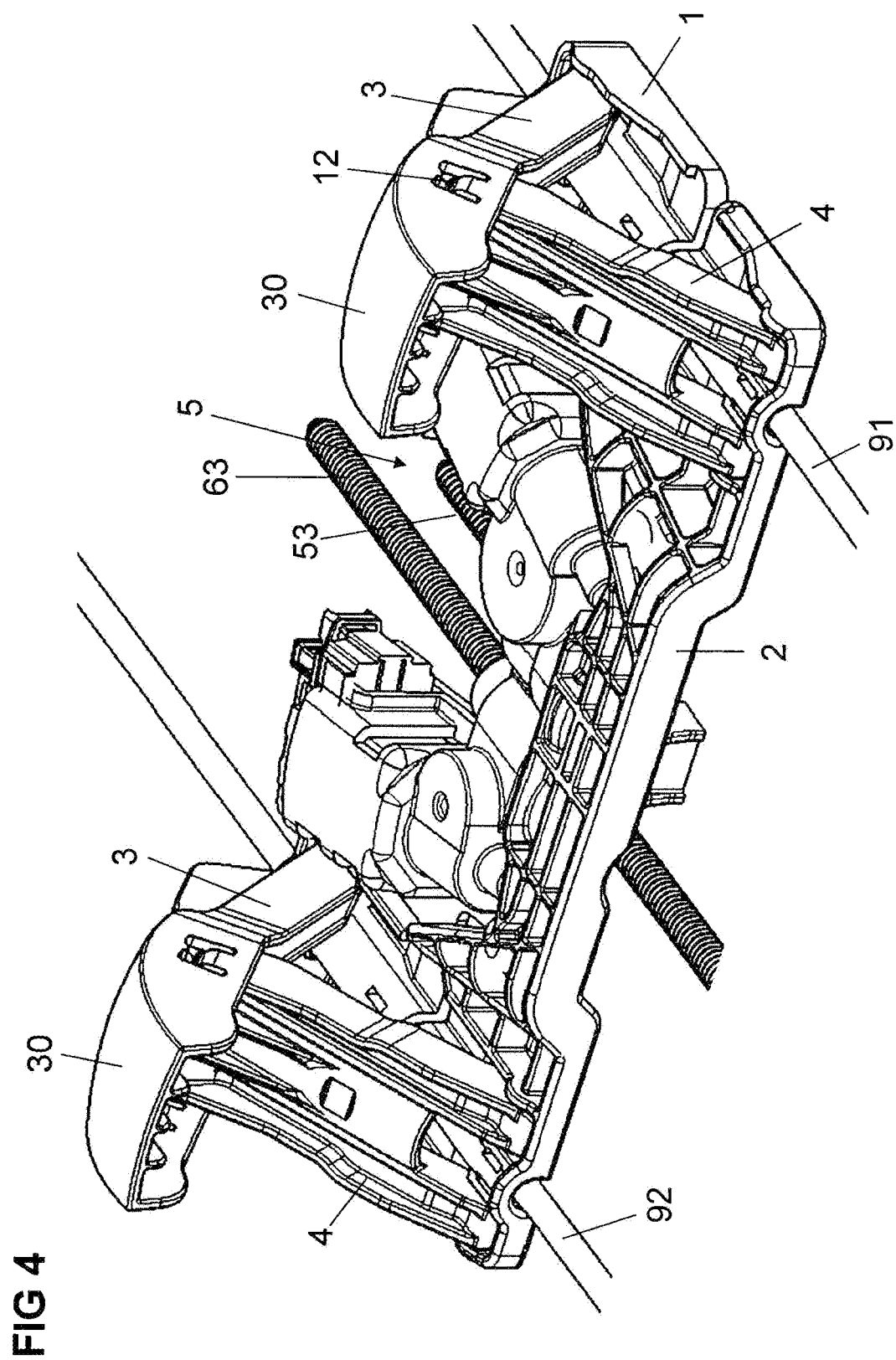
FIG. 4 shows a schematic perspective view of an adjusting device for a lumbar support in the backrest of a vehicle seat with a slide bearing against the support and the support levers and toggle levers raised.
Figure 5:
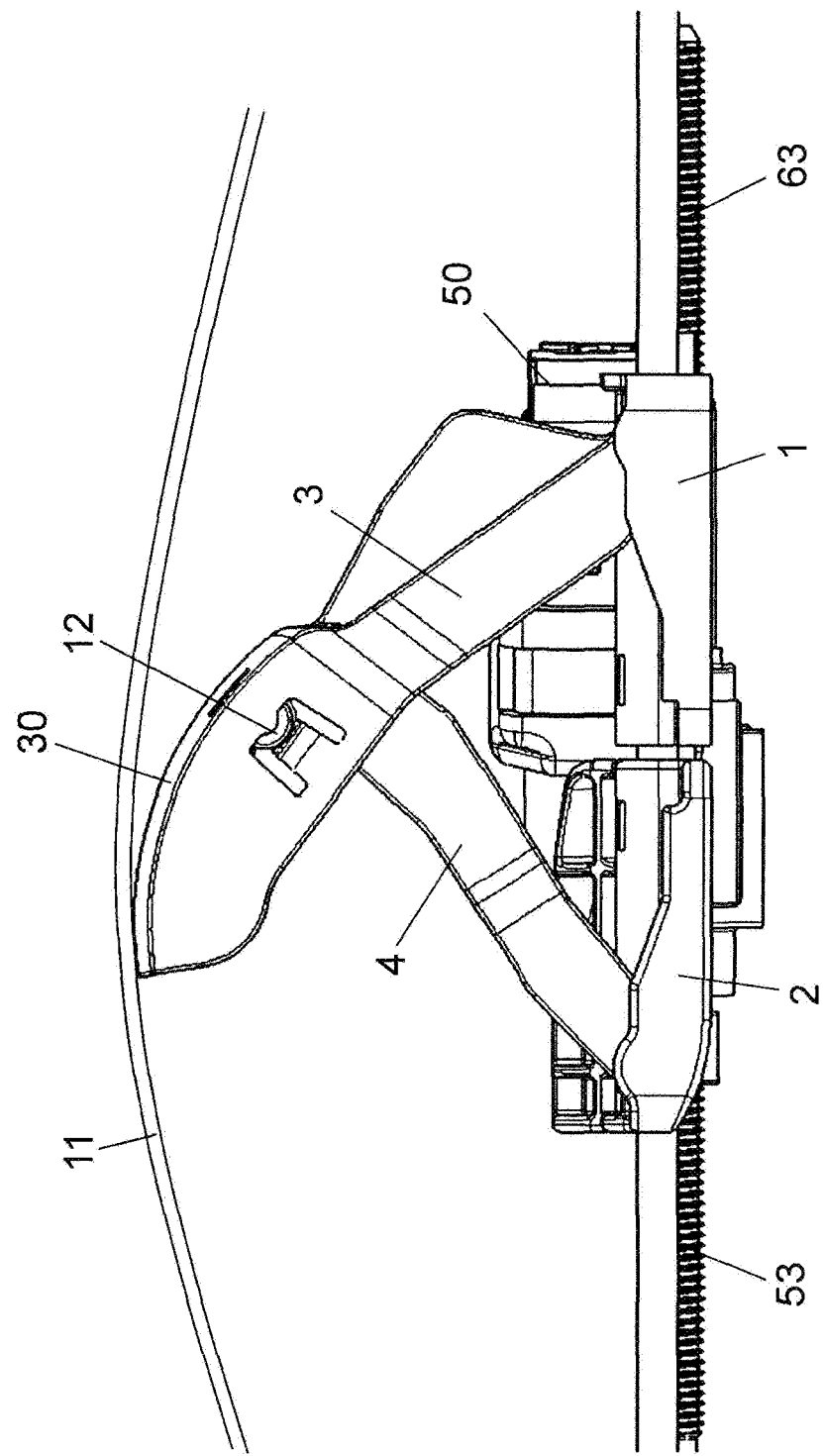
FIG. 5 shows a schematic perspective side view of the adjusting device with the support levers and toggle levers according to FIG. 4 raised.

FIGS. 1 and 4 show in a perspective view with reference to the spatial directions of an XYZ motor vehicle coordinate system and FIGS. 2, 3 and 5 show in side views a modular adjusting device for a leg support, an upper backrest part of a divided backrest or a lumbar support which is fitted in the seat surface or backrest of a vehicle seat and is connected to the strength structure of the seat surface or backrest. To this end, the adjusting device comprises a guide device 9 or is connected to a guide device 9 which consists of a separate guide or a guide integrated in the strength structure of the backrest, to which the adjusting device may be substantially adjusted in the Z-Direction of the motor vehicle coordinate system, i.e. in the direction of the vertical axis, for adapting to the individual upper body length of a passenger. The guide device 9 is configured as a U-shaped wire member with two guide limbs 91, 92 extending in the Z-direction, to which the adjusting device is adjustable in a linear manner, and a U-shaped member 90 connecting together the guide limbs 91, 92.

The adjusting device comprises a plate-shaped support 1 with two sliding parts 101, 102 which in the Z-direction are slidably connected to the guide limbs 91, of the guide device 9, two lever-shaped support levers 3 being pivotably articulated thereon about an axis oriented in the Y-direction of the motor vehicle coordinate system. Moreover, two sliding shoes 201, 202 of a slide 2 are adjustably connected in the direction to the guide limbs 91, 92 of the guide device two pivotable toggle levers 4 being articulated thereon about an axis oriented in the Y-direction of the motor vehicle coordinate system, and the ends of said toggle levers in each case being connected via a connection joint 12 to the support levers 3.

A first electromotive drive device 5 which is configured as a spindle drive is arranged on the support 1, said drive device comprising a first electric motor 50 which via a first gear mechanism 51, which if required implements a reduction or increase in the rotational speed of the motor, drives a first spindle nut 52 which meshes with the thread of a first spindle 53 oriented in the Z-direction, the end thereof being supported on the slide 2. When actuating the first drive device 5 in one or the other rotational direction, the spindle nut 52 connected to the support 1 is rotated in the corresponding rotational direction so that the spindle 53 meshing with the spindle nut 52 is screwed out of the spindle nut 52 or into the spindle nut 52. As a result, the slide 6 which forcibly guided along the guide limbs 91, 92, on which the end of the spindle 53 is supported, is adjusted in a translatory manner in one or the other direction and, corresponding thereto, the spacing between the support and the slide 6 is altered in a linear manner, so that due to the pivotable articulation of the toggle levers 4 on the sliding shoes 201, 202 of the slide 2, the toggle levers 4 are pivoted about the pivot axes and the ends of the toggle levers 4 are lifted or lowered counter to the pivot axes. As a result, the support levers 3 connected via the connection joints 12 to the ends of the toggle levers 4 are lifted and/or lowered, by being pivoted about their articulations on the sliding parts 101, 102 of the support 1.

Not shown in more detail in FIGS. 1 and 4, but illustrated schematically in the side views of FIGS. 2 and 3, is an adjusting surface 11 of the adjustable seat element, for example a comfort mat, a curved contact surface 30 of the support levers 3 bearing thereagainst. By the synchronous lifting or lowering of the support levers 3, therefore, the correspondingly resiliently configured adjusting surface and/or comfort mat of the adjustable seat element is curved or flattened in an increased or reduced manner, in or counter to the X-direction.

A second drive device 6 which is also arranged on the support 1 contains an electric motor 60 and a gear mechanism 61 which implements, if required, a reduction or increase in the rotational speed of the motor and which drives a second spindle nut 62, which meshes with the thread of a second spindle 63 also oriented in the Z-direction. When actuating the second drive device 6, as a result of the second spindle nut 62 meshing with the thread of the second spindle 63 and being connected to the support 1, via the connection of the support 1 to the slide 2 via the first spindle 53, the support and also the slide are adjusted in terms of height along the guide limbs 91, 92 of the guide device 9 in counter to the Z-direction of the motor vehicle coordinate system, in order to adapt the position of the lumbar support to the upper body of a passenger.

In FIGS. 1 and 2, in perspective view and/or in side view, the adjusting device is shown in the fully lowered state of the support levers 3 and in FIGS. 4 and 5 in the maximum raised state of the support levers 3. FIG. 3 shows in a schematic side view a position of the support levers 3 between the fully raised and fully lowered position, with a corresponding average curvature of the adjusting surface 11 of the seat element.

As may be derived from the perspective views of FIGS. 1 and 4, in FIG. 1 the support 1 and the slide 2 have a large spacing from one another, so that the support levers 3 are fully or almost fully lowered and the adjusting surface 11 is substantially extended, whilst in FIG. 4 the spacing of the slide 2 from the support 1 is minimal and/or the slide 2 abuts the support 1, so that the support levers 3 are pivoted to a maximum spacing from the support 1 about the articulation on the sliding parts 101, 102 and the adjusting surface 11 is curved to a maximum extent.

Illustrated schematically in FIG. 3 is the adjustment path s1 of the first spindle 53 for lifting and lowering the support levers 3 and the adjustment path s2 of the second spindle 63 for adjusting the support 1 and thus the adjusting device in the Z-direction.

The particular properties of the adjusting device according to the invention are to be described in more detail with reference to FIGS. 6 to 11.

FIG. 6 shows in a schematic side view the effect of an adjustment of the slide 2 relative to the support 1 by actuating the first spindle 53 of the first drive device 5 over the adjustment path s1 starting from the maximum spacing between the support 1 and the slide 2 as far as the minimum spacing between the support 1 and the slide 2 and in each case the resulting adjusting height, and/or the lift h of the contact point P of the curved contact surface 30 of the support lever 3 on the adjusting surface 11 of the seat element.

As may be derived from the view according to FIG. 6, the contact point P of the curved contact surface 30 of the support lever 3 on the adjusting surface 11 does not migrate, in spite of the linear displacement of the slide 2 in the (negative) Z-direction, i.e. as a result of the curved shape of the contact surface 30 of the support lever 3 adapted to the pivoting arc of the support lever 3, the contact point P remains constant and an undesired displacement of the contact point P perpendicular to the adjusting direction and thus to the curvature of the adjusting surface 11 does rot take place.

In FIGS. 7 and 8 the alteration of the effective lever length l of the support lever 3 is shown according to the lift h in schematic side views of the adjusting device according to the invention, in the lowered state of the adjusting device according to FIG. 7, and in the raised state according to FIG. 8, and shows that in the lowered position according to FIG. 7 the lever length l is substantially less than the lever length l in the raised state of the support lever 3, resulting amongst other things in a variable speed characteristic curve with a rapid adjustment at the start of the movement with a small degree of lift and a slow adjusting speed in the upper lift range for fine adjustment, i.e. a sharp lift from a fully lowered position and subsequently thereto reducing degrees of lift with a uniform linear adjustment of the toggle levers 4.

Figure 10:
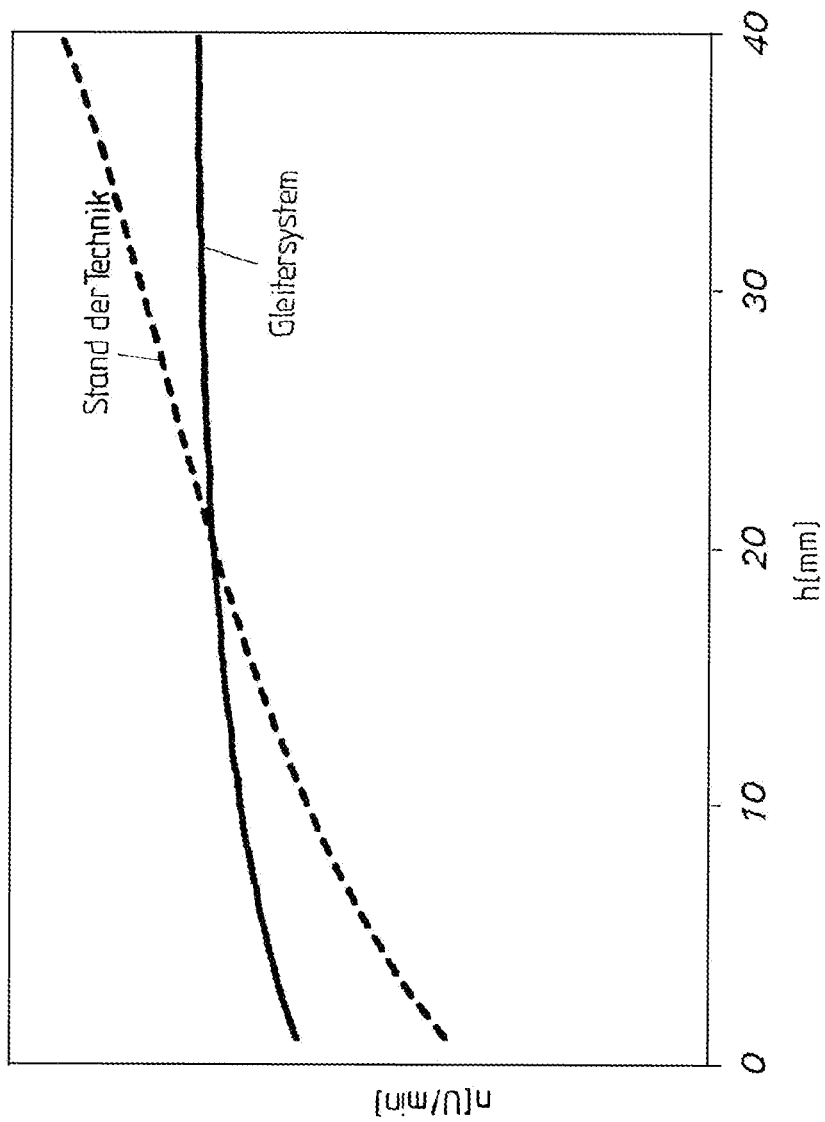
FIG. 10 shows a graph of the rotational speed of the drive motor over the adjustment path and/or lift in a known adjusting device, in comparison with an adjusting device according to the invention.
Figure 11:
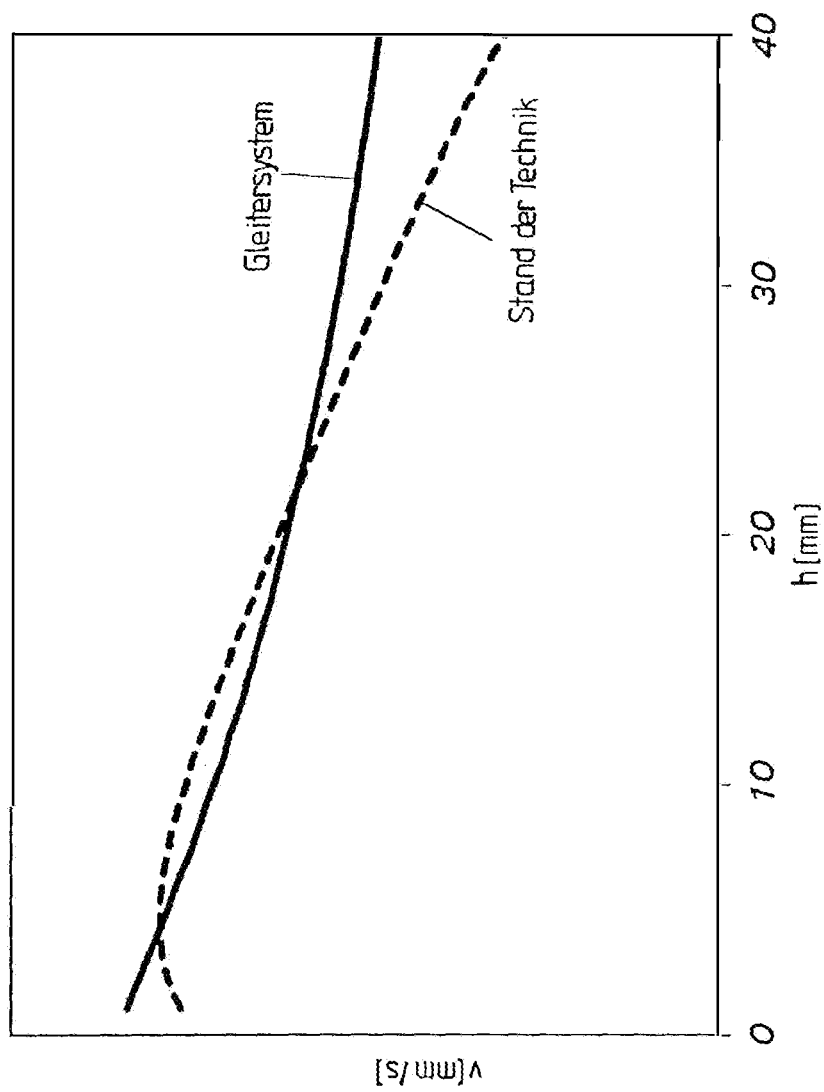
FIG. 11 shows a graph for comparing the speed at the output of the adjusting device over the adjustment path and/or lift in a known adjusting device and in an adjusting device according to the invention.

The lever length l which increases with the increasing adjustment path and/or increasing lift of the support lever 3 leads to the almost constant torque requirement Md of the drive motor shown graphically in FIG. 9 in solid lines, in the slide system according to the invention, the almost constant rotational speed of the motor n shown graphically in FIG. 10 in solid lines and the continually decreasing speed v shown graphically in FIG. 11 in solid lines at the output of the adjusting device over the adjustment path and/or lift h, which corresponds to a high adjusting speed associated with a perceptible adjustment from the lowered position of the support lever 3 and a small adjustment path in the raised position of the support lever 3 for fine tuning of the adjustment. In comparison thereto, the torque behavior and rotational speed behavior and the speed characteristic over the adjustment path and/or lift in a known adjusting device is shown graphically in dashed lines in FIGS. 9 to 11.

Figure 12:
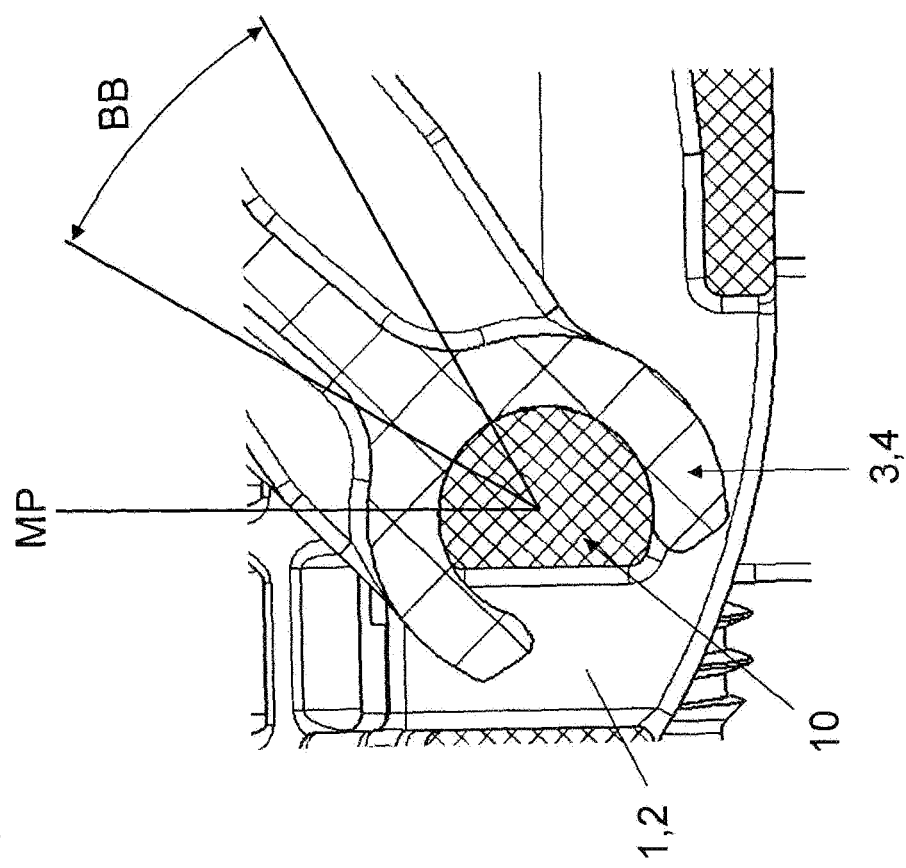
FIG. 12 shows a section through the connection of the support lever and toggle lever via a rotary joint which is able to be joined without the use of force in the assembled position and which produces a positive connection in the operating range.

FIG. 12 shows a preferred articulated connection in a section through an articulation of a support lever 3 on a pivot pin 10 in the sliding part of the support 1 and/or a toggle lever 4 on a pivot pin 10 in the sliding shoe of the slide 2, the pivot pin 10 being configured in said articulated connection as a cylinder portion and the articulated connections of the support lever 3 and/or the toggle lever 4 being fork-shaped with an enclosed angle of >180°, so that in an assembled position MP the support lever and the toggle lever 4 may be joined without the use of force onto the pivot pin 10. In the operating range BB located outside the assembled position, however, a positive connection is produced which permits the desired pivoting movements of the support lever 3 and the toggle lever 4 without external forces being able to cause the articulated connection to be unclipped.

In FIGS. 13 to 17, an exemplary embodiment of the adjusting device according to the invention for lateral face adjustment is shown in a perspective view, in a side view and in longitudinal sections.

Figure 14:
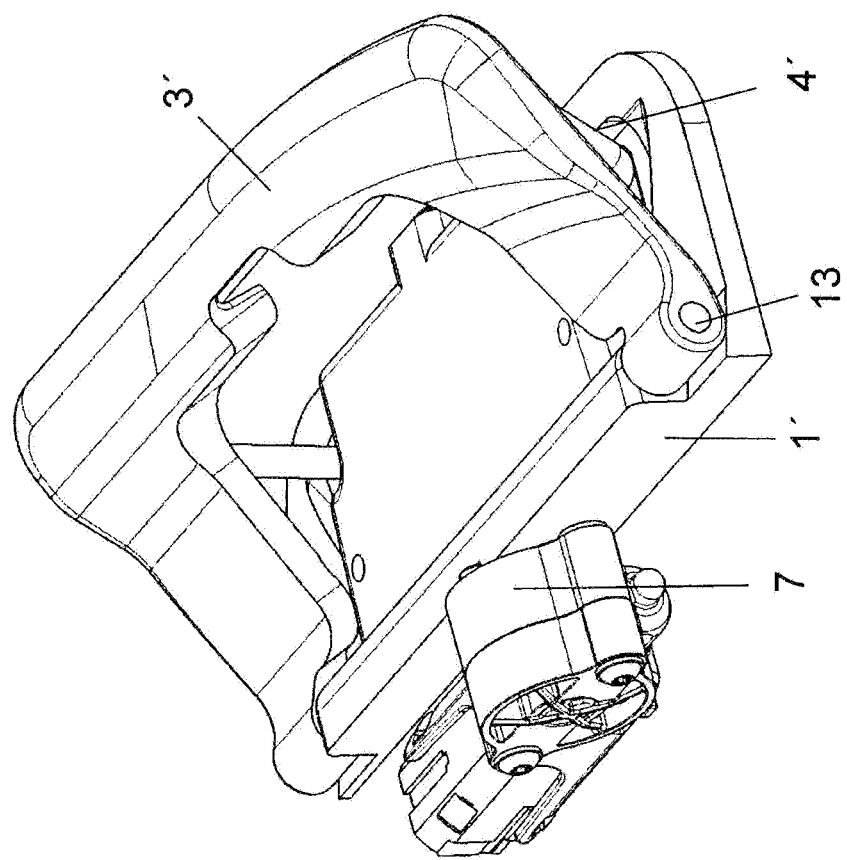
FIG. 14 shows a schematic perspective view of the adjusting device according to FIG. 13 with the lateral face raised.
Figure 13:
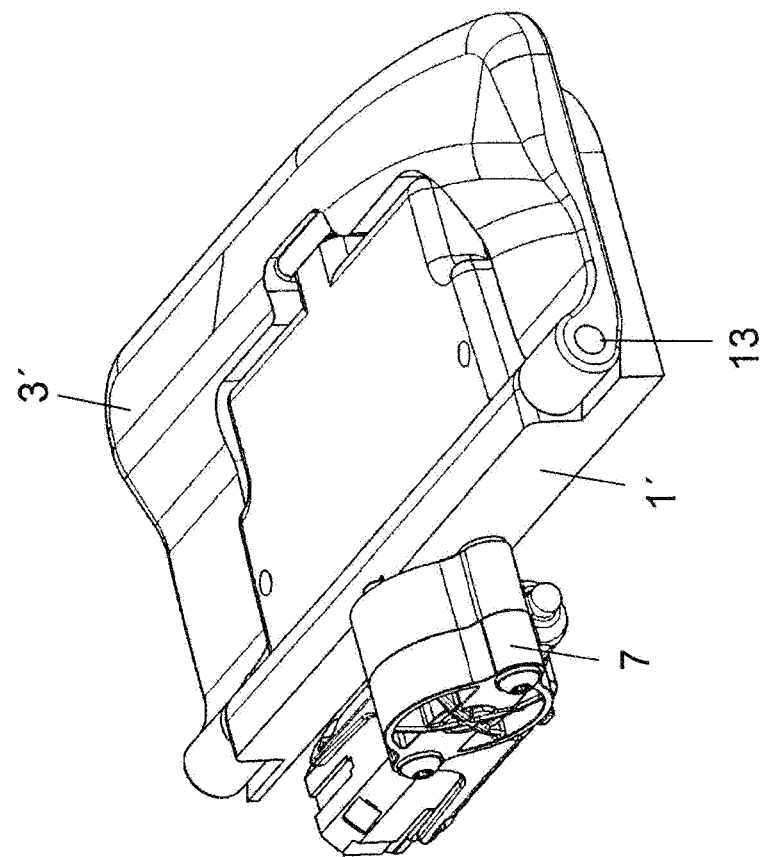
FIG. 13 shows a schematic perspective view of an adjusting device for adjusting the curvature of a lowered lateral face of a seat lower part or a backrest of a vehicle seat.
Figure 15:
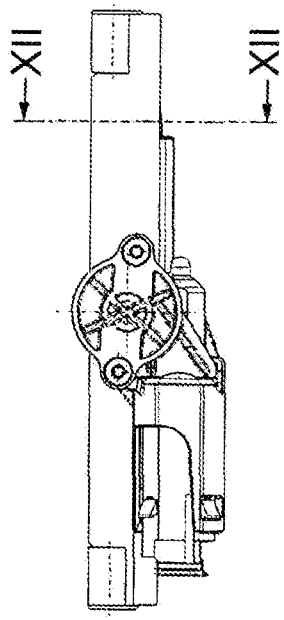
FIG. 15 shows a schematic front side view of the adjusting device according to FIGS. 13 and 14.

The lateral face adjustment has a support 1' which is fixedly connected to the strength structure of a seat lever which is configured as a U-shaped side flap 3' and moved on a circular path about the pivot pin 13, is pivotably articulated on a pivot pin 13 connected to the support 1', and is connected to an actuating lever 4' which, when driven by a drive device 7 and when the lateral face adjustment is actuated, pivots the side flap 3' between the lowered position shown in FIG. 13 and the raised position shown in FIG. 14. The mechanism for pivoting the side flap 3' is explained hereinafter with reference to FIGS. 16 and 17 in which a section is shown along the line XII-XII of the side view of the lateral face adjustment according to FIG. 15.

The kinematics of the lateral face adjustment shown in FIGS. 13 and 14 comprises slide 8 which is displaceable in a linear manner on a guide device 9', driven by the drive device 7, for example via a spindle drive, configured as a sliding element, in which an end of the actuating lever 4' is pivotably mounted, the other end thereof also being pivotably connected to a portion of the U-shaped side flap 3' articulated on the pivot pin 13.

Figure 16:
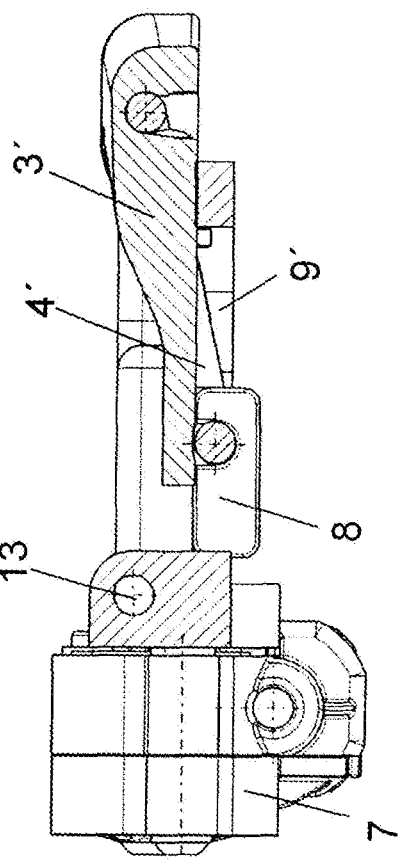
FIG. 16 shows a section through the adjusting device along the line XII-XII according to FIG. 15 with the lowered lateral face according to FIG. 13.
Figure 17:
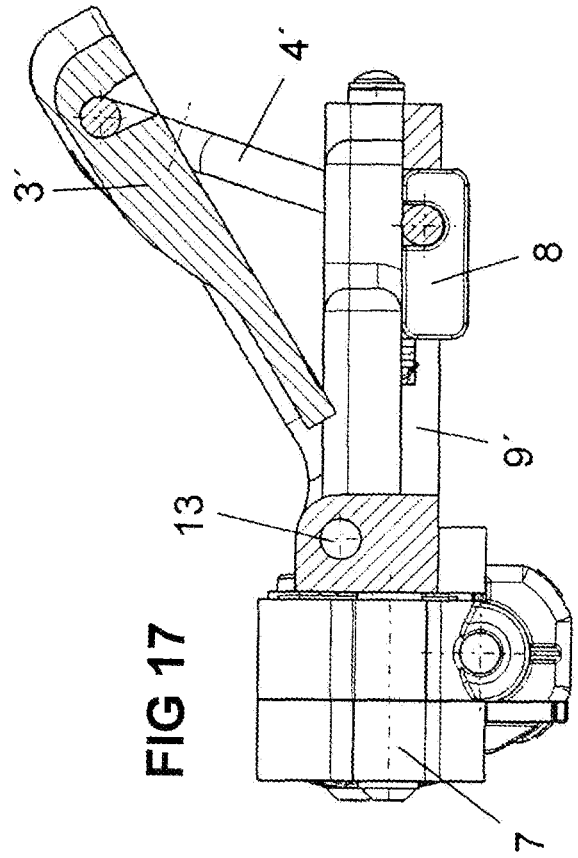
FIG. 17 shows a section through the adjusting device along the line XII-XII according to FIG. 15 with the lateral face raised according to FIG. 14.

If, starting from the lowered side flap 3' shown in FIG. 16 and the slide 8 located at the one end of the guide device 9' adjacent to the drive device 7, the drive device 7 is actuated, the slide 8 is moved in a linear manner on the guide device 9', whereby the toggle lever 4' which is pivotably articulated on the slide 8 and on the side flap 3' is raised and accordingly the side flap 3' connected to the toggle lever 4' and articulated on the pivot pin 13 is raised, until the slide 8 reaches the other end of the guide device 9' remote from the drive device 7 and thus effects the maximum raising of the side flap 3'.

The lateral face adjustment serves for the individual adjustment of the lateral support of a passenger by individually adjusting the seat width and/or backrest width of a vehicle seat. Additionally, by an adjustment of the side flap 3' into the lowered position, shown in FIG. 16, the boarding or disembarking of a passenger in and/or out of a vehicle may be simplified by the increase of the seat surface in the lateral direction and/or the backrest being reduced by retracting the side flap 3' from a raised position into the lowered position.

The two side flaps of the lateral e adjustment may be actuated either together by means of a drive device or individually via separate drive devices. A separate side flap drive, for example, may be required in vehicle interiors with a narrow point defining the adjustment path between a seat lateral face on the vehicle tunnel side and a vehicle tunnel. In order to permit simplified boarding and disembarking, therefore, it is advantageous to move the seat lateral ace on the vehicle door side down as far as possible.

All of the functional elements of the adjusting devices described above may be designed as modular pre-assemblies which are configured to be the same for different applications, so that the use of a maximum number of the same parts is achieved, whereby the production costs are lowered. A project-specific adaptation has, to be undertaken merely at the interfaces with the relevant seating element so that, for example, with reference to the above-described lateral face adjustment a project-specific the support 1' and the side flap 3' is required which is assembled with the further functional elements on the pre-assembly.

The kinematics of the adjusting device according to the invention permits further embodiments in addition to the above-described variants, only two variants thereof being intended to be described in more detail hereinafter with reference to FIGS. 18 and 19 by way of example.

For raising and lowering a support lever 3 by linear adjustment of the articulation of the toggle lever 4, for example on a slide which is adjustable by means of a spindle drive, additionally the articulation of the support lever 3 may also be adjusted during a drive movement. As a result, a combined movement is able to be implemented in which, for example, with a lateral face adjustment, the seat width and/or backrest width of a vehicle seat is adjusted in addition to the lowering and raising of the support lever 3. This may take place both in opposing directions of movement of the articulations of the support lever 3 and the toggle lever 4 and also in the same direction of movement of the articulations of the support lever 3 and the toggle lever 4 at a different adjusting speed.

FIG. 18 shows in a schematic view a combined adjustment of an adjusting device by opposingly oriented adjusting movements of the articulations of a support lever 3 and a toggle lever 4 connected to the support lever 3 via a connection joint 12. To this end a drive device 7 is provided, said drive device having an electric motor 70 and a spindle 71 with thread portions 72, 73 with opposingly oriented thread pitches which mesh with spindle nuts in a support 1 and/or a slide 2, so that the support 1 and the slide 2 are moved in opposingly oriented directions ±R.

FIG. 19 shows in a schematic view a combined adjustment of an adjusting device with adjusting movements in the same direction of the articulations of a support lever 3 and a toggle lever 4 connected to the support lever 3 via a connection joint 12. A drive device 7 has an electric motor 70 and a spindle 74 with thread portions 75, 76 which are oriented in the same direction but have different thread pitches which mesh with spindle nuts in a support 1 and a slide 2, so that the support 1 and the slide 2 guided on the same guide device as the support 1, are moved in the same direction but at different speeds v1 and v2 depending on the respective thread pitches of the same spindle 74.

LIST OF REFERENCE NUMERALS

1, 1' Support
2, 2' Slide
3 Support lever
3' Side flap
4, 4 Toggle lever
5, 6, 7 Drive device
8 Slide, sliding element
9 Guide device
10 Pivot pin
11 Adjusting surface, comfort mat
12 Connection joint
13 Pivot pin
30 Contact surface
50, 60, 70 Electric motor
51, 61 Gear mechanism
52, 62 Spindle nut
53, 63 Spindle
71, 74 Spindle
72, 73 Threaded portions with opposing thread pitches
75, 76 Threaded portions with different thread pitches
90 U-shaped member
91, 92 Guide limb
101, 102 Sliding parts
201, 202 Sliding shoes
BB Operating range
h Adjusting height, lift
I Lever length
MP Assembled position
P Contact point
s1, s2 Adjustment paths
X, Y, Z Coordinates of motor vehicle coordinate system
Md Torque requirement
n Rotational speed of motor
v Output speed

The invention claimed is:

1. An adjusting device for a seat element of a vehicle seat, the adjusting device comprising:
    a guide device configured to be connected to a strength structure of said seat element and being substantially oriented in a first spatial direction;
    a support and a slide at the guide device, the support and the slide being arranged to be longitudinally adjustable relative to each other;
    a first drive device for adjusting the support and the slide relative to each other,
    a support lever being configured to change a contour of the seat element and being hinged to the support to be pivotable about a first axis,
    a toggle lever being hinged to the slide to be pivotable about a second axis different from the first axis and being hinged, via a connection joint, to the support lever,
    wherein the first and second axes are oriented in a second spatial direction running perpendicularly to the first spatial direction, and
    wherein the support lever and the toggle lever are configured to pivot, when the first drive device is actuated, in a plane defined by the first spatial direction and a third spatial direction running perpendicularly to the first and second spatial directions.

2. The adjusting device as claimed in claim 1, wherein a contact surface of the support lever is curved such that a contact region bearing against the seat element or contact point of the contact surface of the support lever, when actuating the first drive device, is moved between a position in the vicinity of the articulation of the support lever on the support and remote from the articulation of the support lever on the support, altering the effective lever length of the support lever.

3. The adjusting device as claimed in claim 1, wherein the support is connected to a second drive device for adjusting the support relative to the strength structure of the vehicle seat along the guide device connected to the strength structure of the vehicle seat.

4. The adjusting device as claimed in claim 1, wherein the first drive device comprises a spindle which meshes with a spindle nut connected to the slide.

5. The adjusting device as claimed in claim 4, wherein the support and the slide comprise a spindle nut which mesh with the same spindle and are adjustable in opposing directions.

6. The adjusting device as claimed in claim 4, wherein the support and the slide comprise a spindle nut which mesh with the same spindle and are adjustable in the same direction at a different adjusting speed.

7. The adjusting device as claimed in claim 6, wherein the spindle has different thread pitches, the one thread pitch thereof meshing with a spindle nut connected to the support and the other thread pitch thereof meshing with a spindle nut connected to the slide.

8. The adjusting device as claimed in claim 1, wherein the support comprises two support levers which are arranged adjacent to one another in the second spatial direction perpendicular to the first spatial direction and which are connected in an articulated manner to two toggle levers arranged adjacent to one another on the slide, such that when actuating the first drive device the support levers and toggle levers which are connected together in an articulated manner are pivotable in the third spatial direction perpendicular to the first and second spatial direction.

9. The adjusting device as claimed in claim 1, wherein the guide device comprises a two-limbed U-shaped wire member, at least the slide being arranged so as to be adjustable in a linear manner on guide limbs of the wire member.

10. The adjusting device as claimed in claim 1, wherein the support and toggle levers in a mounting position are able to be connected together without the use of force, and, in an operating range, are positively connected to the support or the slide such that the support and toggle levers are pivotable only within the operating range.

11. The adjusting device as claimed in claim 10, wherein the support and toggle levers are connected via rotary joints to the support element and/or the slide, respectively, and the rotary joints comprise a cylinder portion-shaped pivot pin connected to the support or slide, and fork-shaped joint portions of the support and toggle levers.

12. The adjusting device as claimed in claim 1, wherein the slide is adjustable by the first drive device in a linear manner.

13. The adjusting device as claimed in claim 1, wherein the support lever comprises a U-shaped side flap, limbs of the side flap being connected in an articulated manner to two toggle levers driven by the first drive device, and a crosspiece of the side flap connected to the ends of the limbs being configured as a support surface.

14. The adjusting device as claimed in claim 1, wherein the toggle lever, by actuating the drive device, is pivotable about the second axis to adjust the support lever, to which the toggle lever is hinged via the connection joint, thereby pivoting the support lever about the first axis.

* * * * *